US009108257B2

(12) United States Patent
Maruyama (10) Patent No.: US 9,108,257 B2
(45) Date of Patent: Aug. 18, 2015

(54) GEAR SHAPING MACHINE (75) Inventor: Kazutaka Maruyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 420 days.

(21) Appl. No.: 13/504,849

(22) PCT Filed: Sep. 9, 2010

(86) PCT No.: PCT/JP2010/065463
§ 371 (c)(1),
(2), (4) Date: Jun. 13, 2012

(87) PCT Pub. No.: WO2011/096104
PCT Pub. Date: Aug. 11, 2011

(65) Prior Publication Data
US 2012/0301241 A1 Nov. 29, 2012

(30) Foreign Application Priority Data

Feb. 5, 2010 (JP) .................................. 2010-023746

(51) Int. Cl.
B23F 1/04 (2006.01)
B23F 5/16 (2006.01)

(52) U.S. Cl.
CPC ... *B23F 1/04* (2013.01); *B23F 5/16* (2013.01); *Y10T 409/105883* (2015.01)

(58) Field of Classification Search
CPC ............... B23F 1/04; B23F 5/12; B23F 5/16; B23F 5/18
USPC ........... 409/33, 34, 35, 36, 37, 31, 42, 46, 49, 409/58
See application file for complete search history.

(56) References Cited

U.S. PATENT DOCUMENTS 3,823,641 A   7/1974  Seiberlich
4,244,668 A * 1/1981  Demuth .......................... 409/46
(Continued)

FOREIGN PATENT DOCUMENTS

CN   101185982 A    5/2008
JP   48-62093 A     8/1973
(Continued)

OTHER PUBLICATIONS

Chinese Office Action dated Nov. 5, 2013 for related application No. 201080049264.6 with an English translation.
(Continued)

*Primary Examiner* — Daniel Howell
*Assistant Examiner* — Alan Snyder
(74) *Attorney, Agent, or Firm* — Birch Stewart Kolasch & Birch, LLP (57) ABSTRACT The vertical movement cycle and trajectory inclination angle of a cutter are switched so that when a main spindle is moving downward, a head is moved to position the cutter at a machining location, and the cutter is lowered rectilinearly; that when the main spindle is moving upward, the head is moved to position the cutter at a withdrawal location; that, when an external gear is to be generated by cutting, relieving means for rectilinearly raising the cutter cause the machining location to be positioned on one radial side of the cutter and move the cutter downward parallel to the axis of a workpiece; and that when an internal gear is to be generated by cutting, said relieving means cause the machining location to be positioned on the other radial side of the cutter and move the cutter downward parallel to the axis of the workpiece.

1 Claim, 9 Drawing Sheets (56) References Cited

U.S. PATENT DOCUMENTS

| | | | |
|---|---|---|---|
| 4,695,209 A * | 9/1987 | Noguchi et al. | 409/42 |
| 5,018,913 A | 5/1991 | Seiberlich | |
| 6,905,292 B2 * | 6/2005 | Schuon | 409/2 |
| 2008/0112770 A1 | 5/2008 | Haas | |

FOREIGN PATENT DOCUMENTS

| JP | 50-2298 | 1/1975 |
|---|---|---|
| JP | 50-15888 | 2/1975 |
| JP | 1-310836 A | 12/1989 |
| JP | 2004-154921 A | 6/2004 |
| JP | 2007-130706 a | 5/2007 |
| JP | 2008-119825 A | 5/2008 |

OTHER PUBLICATIONS

International Search Report and Written Opinion of the International Searching Authority with English translation mailed Nov. 9, 2010.

* cited by examiner

GEAR SHAPING MACHINE

TECHNICAL FIELD

The present invention relates to a gear shaping machine configured to manufacture a gear through generating cutting of external teeth and internal teeth in a workpiece by means of a pinion cutter, and is significantly effective particularly when applied to a type of machine configured to manufacture a large external gear or a large internal gear through generating cutting on a large workpiece.

BACKGROUND ART

Figure 7:
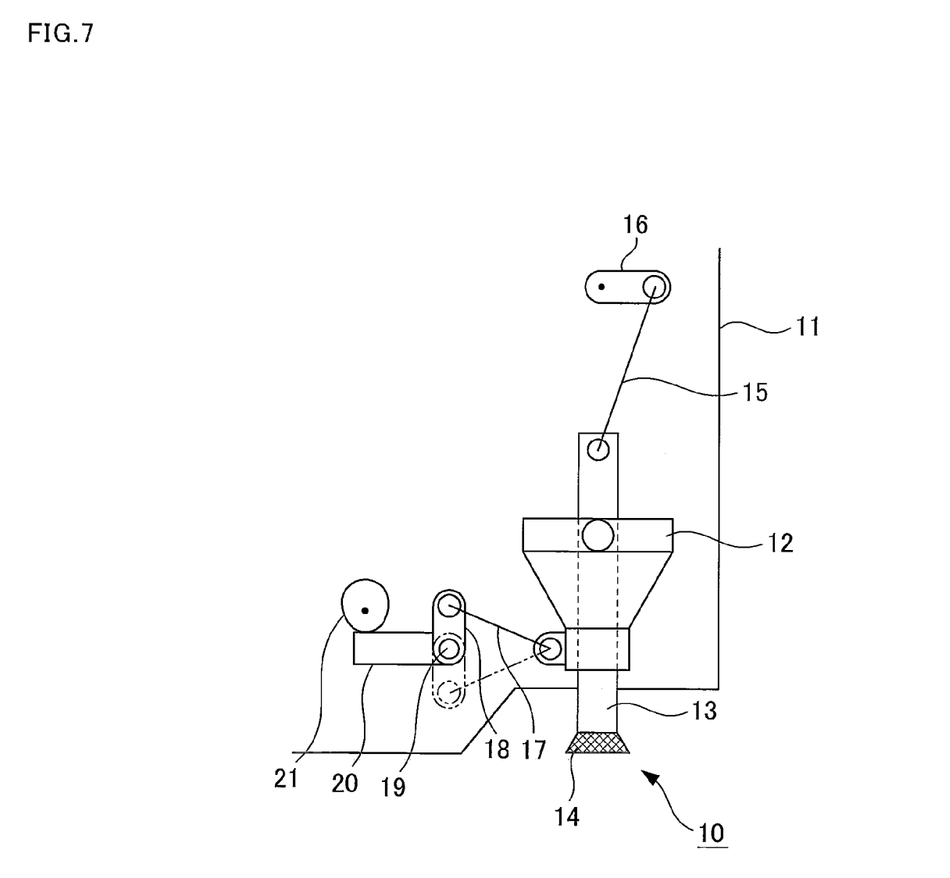
FIG. 7 is a schematic configuration diagram of a main part of the exemplary conventional gear shaping machine.

FIG. 7 shows a schematic configuration of a main part of an exemplary conventional gear shaping machine (gear shaper) configured to manufacture a large external gear and a large internal gear through generating cutting of external teeth and internal teeth in a large workpiece by means of a pinion cutter.

As shown in FIG. 7, a cutter head 12 is disposed inside a housing 11, and a proximal side of the cutter head 12 is supported pivotally so that a distal side thereof may be swingable. A main spindle 13 is disposed in the cutter head 12 and penetrates therethrough with its distal side projected. The main spindle 13 is supported to be slidable in the axial direction, i.e., movable vertically, and also rotatable in the circumferential direction, relative to the cutter head 12. The main spindle 13 has its distal side projected from the inside of the housing 11, and a pinion cutter 14 is coaxially attached to the distal end.

The inner side of an annular external gear (unillustrated) is coaxially spline-coupled to the outer surface of the main spindle 13 so that rotation in the circumferential direction relative to the main spindle 13 may be restricted but movement in the axial direction relative to the main spindle 13 can be permitted. The external teeth on the external gear are meshing directly or indirectly with a drive gear (unillustrated) coaxially coupled to a drive shaft of an unillustrated drive source for rotation.

Specifically, when the drive shaft of the drive source for rotation is rotated, the main spindle 13 can be moved vertically relative to the cutter head 12 while being rotated in the circumferential direction through the drive gear, the external gear, and the like.

A distal side of a rod 15 is coupled to the proximal side of the main spindle 13 through a universal joint (unillustrated). A proximal side of the rod 15 is pivotally coupled to a distal side of a crank 16. A proximal side of the crank 16 is coupled to a drive shaft of an unillustrated drive source for vertical movement.

Specifically, as the drive shaft of the drive source for vertical movement is rotated, the crank 16 is rotated about its proximal side to swing its distal side. As transmitted through the rod 15 and the universal joint, the rotation can vertically move the main spindle 13 relative to the cutter head 12 together with the rotation in the circumferential direction.

A distal side of a rod 17 is coupled to the distal side of the cutter head 12 in such a way as to be pivotable in the same direction as that of the swing of the cutter head 12 about a swing shaft thereof. A proximal side of the rod 17 is pivotally coupled to a distal side of a link 18. A proximal side of the link 18 is coupled to a pivotally supported support shaft 19 through an unillustrated clamp mechanism. The link 18 can be rotated together with the support shaft 19 by closing the clamp mechanism, and can be rotated freely from the support shaft 19 by opening the clamp mechanism.

A proximal side of a lever 20 is integrally coupled to the support shaft 19. A cam 21 coupled to a drive shaft of an unillustrated drive source for relief is disposed on a distal side of the lever 20. The distal side of the lever 20 is biased by biasing means (unillustrated) to be always in contact with the cam surface of the cam 21.

Specifically, as the clamp mechanism is closed and the drive shaft of the drive source for relief is rotated, the lever 20 turns the support shaft 19 and swings the distal side of the link 18 in a way corresponding to the cam surface of the cam 21 having a predetermined profile, and thereby swings the distal side of the cutter head 12 through the rod 17. Accordingly, the position of the distal side of the main spindle 13, i.e. the position of the pinion cutter 14 can be swung and switched between a machining position at which the pinion cutter 14 contacts the workpiece and a relieved position at which the pinion cutter 14 is away from the workpiece.

Next, operations of the conventional gear shaping machine 10 configured as above will be described based on FIGS. 8 and 9.

Figure 8:
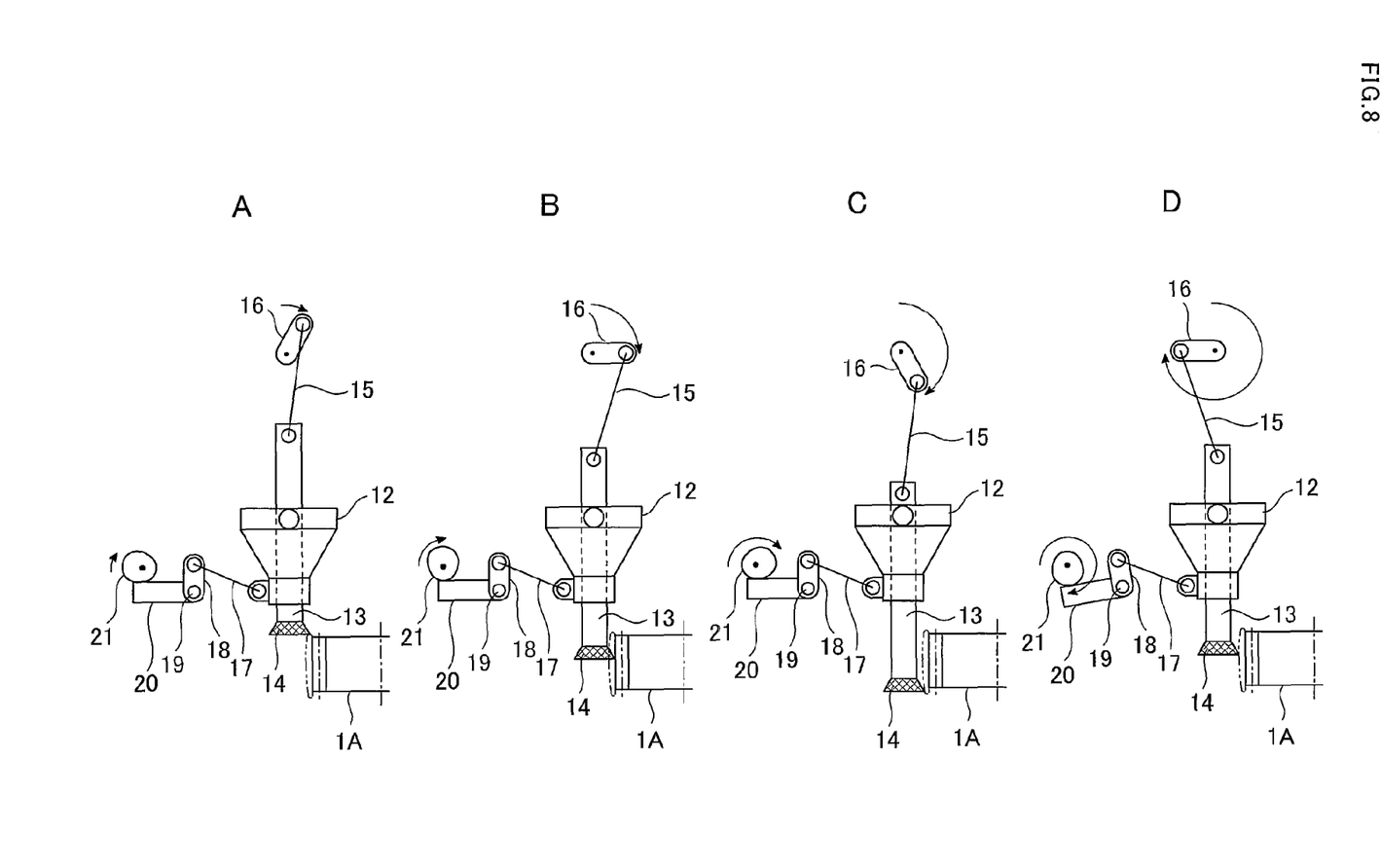
FIG. 8 is a diagram describing an operation in external tooth generation by the gear shaping machine in FIG. 7.

As shown in FIG. 8, in a case of generating external teeth in a disk-shaped workpiece 1A, firstly, the clamp mechanism is opened, and the link 18 is pivoted about the support shaft 19 such that the distal side of the link 18 may be located at an upper, external-tooth machining position. Then, the clamp mechanism is closed to integrally fix the link 18 to the support shaft 19.

Subsequently, the drive source for rotation, the drive source for vertical movement, and the drive source for relief are actuated to rotate their drive shafts, and also an unillustrated table supporting the workpiece 1A is rotated. Along with the actuation of the drive source for rotation, the pinion cutter 14 is rotated through the gears and the main spindle 13. Moreover, along with the actuation of the drive source for vertical movement, the pinion cutter 14 is moved down in parallel with the axis of the workpiece 1A through the crank 16, the rod 15, the universal joint, and the main spindle 13. As a result, an external tooth is generated in a portion, in the circumferential direction, of the outer surface of the workpiece 1A (Parts A to C of FIG. 8).

Then, as the pinion cutter 14 is moved down to its lowermost position, the distal side of the lever 20 is pushed down along with the rotation of the cam 21 by the actuation of the drive source for relief. This turns the support shaft 19 and swings the distal side of the link 18 in a direction toward a radially outer side of the workpiece 1A (counterclockwise in FIG. 8), thereby moving the distal side of the cutter head 12 through the rod 17 in a direction away from the outer surface of the workpiece 1A (leftward in FIG. 8). As a result, the pinion cutter 14 is moved away from the outer surface of the workpiece 1A through the main spindle 13 so as to be located at the relieved position at the other side in the radial direction (left side in FIG. 8), and is also moved up along an arc path (relieving: Part D of FIG. 8).

Then, as the pinion cutter 14 is moved up to its uppermost position, the biasing force of the biasing means based on the rotation of the cam 21 brings the distal side of the lever 20 back to the initial position. This swings the distal side of the link 18 through the support shaft 19 in a direction toward a radially inner side of the workpiece 1A (clockwise in FIG. 8) and moves the distal side of the cutter head 12 through the rod 17 in a direction to approach the outer surface of the workpiece 1A (rightward in FIG. 8). As a result, through the main spindle 13, the pinion cutter 14 approaches the outer surface of the workpiece 1A so as to be located at the machining position at one side in the radial direction (right side in FIG. 8), and also the pinion cutter 14 is again moved down in parallel with the axis of the workpiece 1A. Along with this, the table is rotated, so that another external tooth is continuously generated in the outer surface of the workpiece 1A adjacently to the last generated external tooth (Parts A to C of FIG. 8).

By repeating the above-described operations subsequently, external teeth can be generated in the outer surface of the workpiece 1A over the entire circumferential length thereof.

Figure 9:
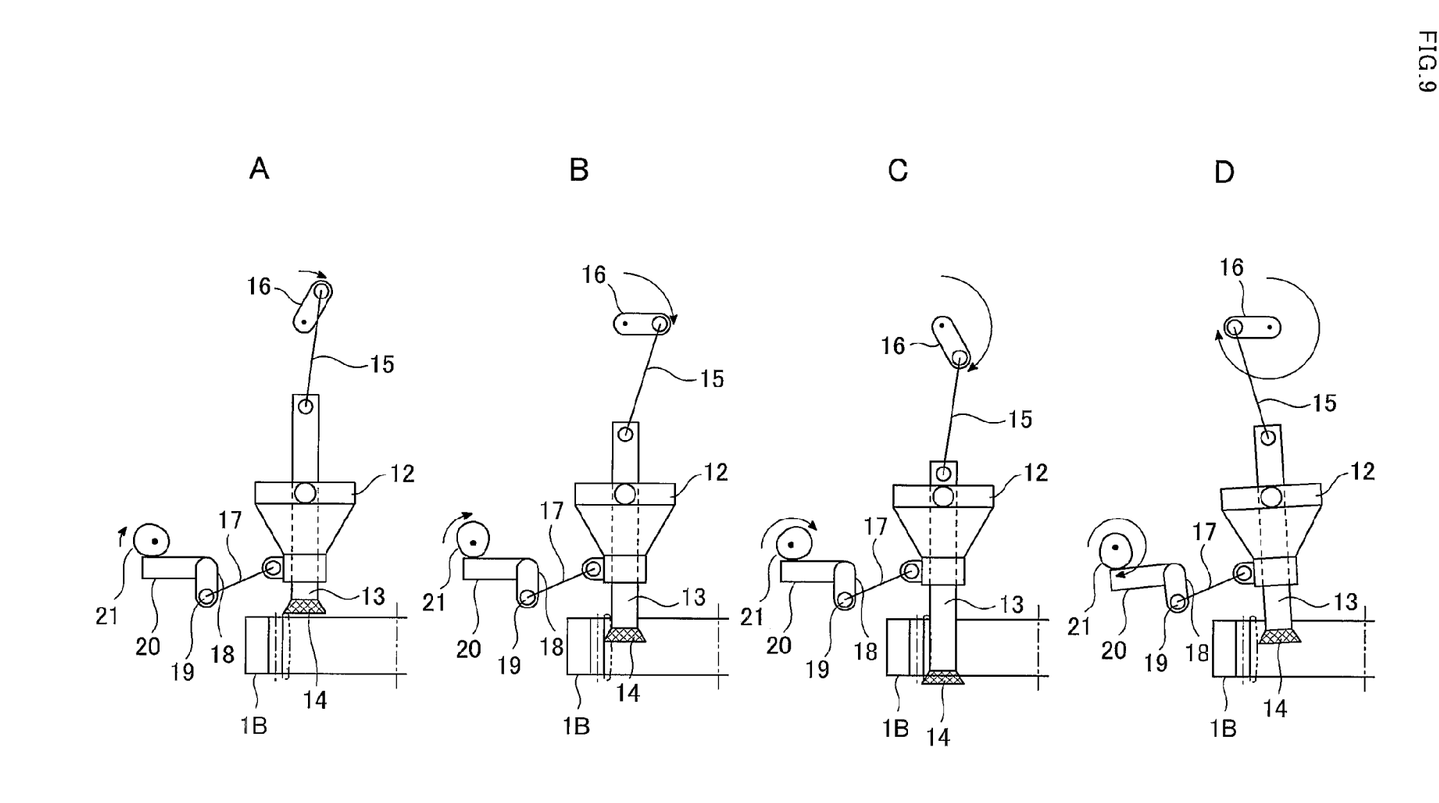
FIG. 9 is a diagram describing an operation in internal tooth generation by the gear shaping machine in FIG. 7.

On the other hand, as shown in FIG. 9, in a case of generating internal teeth in an annular workpiece 1B, firstly, the clamp mechanism is opened, and the link 18 is pivoted about the support shaft 19 such that the distal side of the link 18 may be located at a lower, internal-tooth machining position. Then, the clamp mechanism is closed to integrally fix the link 18 to the support shaft 19.

Subsequently, as in the case of external tooth machining, the drive source for rotation, the drive source for vertical movement, and the drive source for relief are actuated to rotate their drive shafts, and also an unillustrated table supporting the workpiece 1B is rotated. Along with the actuation of the drive source for rotation, the pinion cutter 14 is rotated through the gears and the main spindle 13. Moreover, along with the actuation of the drive source for vertical movement, the pinion cutter 14 is moved down in parallel with the axis of the workpiece 1B through the crank 16, the rod 15, the universal joint, and the main spindle 13. As a result, an internal tooth is generated in a portion, in the circumferential direction, of the inner surface of the workpiece 1B (Parts A to C of FIG. 9).

Then, as the pinion cutter 14 is moved down to its lowermost position, the distal side of the lever 20 is pushed down along with the rotation of the cam 21 by the actuation of the drive source for relief. This turns the support shaft 19 and swings the distal side of the link 18 in a direction toward a radially inner side of the workpiece 1B (counterclockwise in FIG. 9), thereby moving the distal side of the cutter head 12 through the rod 17 in a direction away from the inner surface of the workpiece 1B (rightward in FIG. 9). As a result, the pinion cutter 14 is moved away from the inner surface of the workpiece 1B through the main spindle 13 so as to be located at the relieved position at the one side in the radial direction (right side in FIG. 9), and is also moved up along an arc path (relieving: Part D of FIG. 9).

Then, as the pinion cutter 14 is moved up to its uppermost position, the biasing force of the biasing means based on the rotation of the cam 21 brings the distal side of the lever 20 back to the initial position. This swings the distal side of the link 18 through the support shaft 19 in the direction toward the radially inner side of the workpiece 1B (clockwise in FIG. 9) and moves the distal side of the cutter head 12 through the rod 17 in a direction to approach the inner surface of the workpiece 1B (leftward in FIG. 9). As a result, through the main spindle 13, the pinion cutter 14 approaches the inner surface of the workpiece 1B so as to be located at the machining position at the other side in the radial direction (left side in FIG. 9), and also the pinion cutter 14 is again moved down in parallel with the axis of the workpiece 1B. Along with this, the table is rotated, so that another internal tooth is continuously generated in the inner surface of the workpiece 1B adjacently to the last generated internal tooth (Parts A to C of FIG. 9).

By repeating the above-described operations subsequently, internal teeth can be generated in the inner surface of the workpiece 1B over the entire circumferential length thereof.

Thus, in the gear shaping machine 10, external teeth can be generated in the disk-shaped workpiece 1A, and internal teeth can be generated in the annular workpiece 1B, as a matter of course. In addition to this, the link 18 may be pivoted to locate the distal side of the link 18 at the upper, external-tooth machining position or the lower, internal-tooth machining position, and therefore the machining position and the relieved position of the pinion cutter 14 at the one and the other sides in the radial direction can be switched between the case of external tooth generation (when the right side of the pinion cutter 14 in FIG. 8 is the machining position) and the case of internal tooth generation (when the left side of the pinion cutter 14 in FIG. 9 is the machining position). Accordingly, the position of the workpiece 1A for external tooth generation and the position of the workpiece 1B for internal tooth generation relative to the main spindle 13 do not need to differ greatly from each other. Even when the workpieces 1A and 1B are large (e.g. several meters in diameter), a single machine can perform both external tooth generation and internal tooth generation without a major overhang of the main spindle 13 and the like.

CITATION LIST

Patent Literatures

Patent Literature 1: Japanese Utility Model Registration Application Publication No. Sho 50-015888
Patent Literature 2: Japanese Patent Application Publication No. 2004-154921

SUMMARY OF INVENTION

Technical Problem

Figure 10:
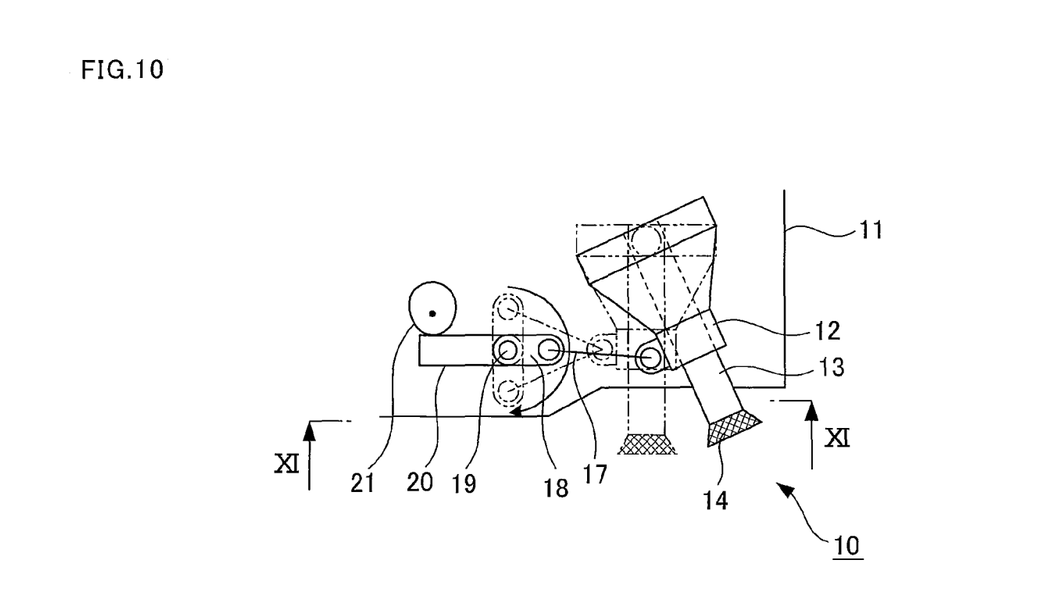
FIG. 10 is a diagram describing an operation in the switching of the machining position of a pinion cutter of the gear shaping machine in FIG. 7.

Meanwhile, in the above-described conventional gear shaping machine 10, the machining position and the relieved position of the pinion cutter 14 at the one and the other sides in the radial direction are switched between the case of external tooth generation and the case of internal tooth generation by pivoting the link 18 to switch the distal side of the link 18 between the upper, external-tooth machining position and the lower, internal-tooth machining position, as described earlier. Thus, the distal side of the cutter head 12 is largely swung during the switching, as shown in FIG. 10.

For this reason, a space large enough to permit the swing of the cutter head 12 in the switching needs to be secured inside the housing 11, thereby increasing the size of the housing 11.

Figure 11:
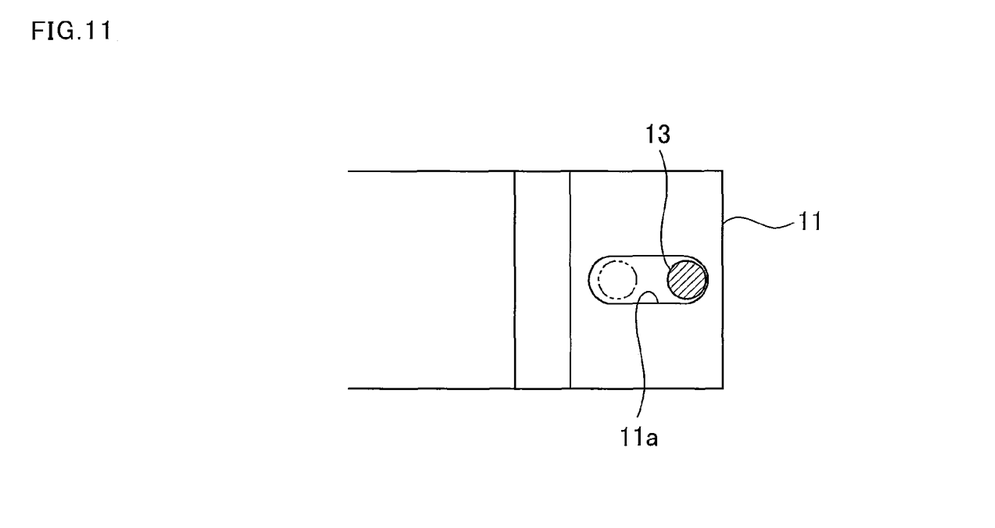
FIG. 11 is a diagram viewed in the direction of the arrows XI in FIG. 10.

Further, since the main spindle 13 projected from the inside of the housing 11 is largely swung as well, a large opening 11a for allowing the swing of the main spindle 13 in the switching needs to be formed in the housing 11, as shown in FIG. 11. Thus, various means for preventing the entry of foreign matters, such as cutting oil and chips, need to be provided. This has been one of the causes of cost increase.

In view of this, an object of the present invention is to provide a gear shaping machine capable of reducing the width of swing of a cutter head, which occurs during the switching between external tooth generation and internal tooth generation, to a small width.

Solution to Problem

A gear shaping machine according to a first aspect of the invention for solving the problems is a gear shaping machine configured to manufacture a gear through generating cutting of external teeth and internal teeth in a workpiece by means of a pinion cutter, characterized in that the gear shaping machine comprises: a main spindle, to a distal end of which the pinion cutter is attached; a cutter head on which the main spindle is rotatably and vertically movably supported with a distal side of the main spindle projected from a distal side of the cutter head, and which is pivotally supported at a proximal side thereof; rotationally driving means for rotationally driving the main spindle; vertically moving means for vertically moving the main spindle; and relieving means for, during downward movement of the main spindle, swinging the distal side of the cutter head in such a way that the pinion cutter is located at a machining position at which the pinion cutter contacts the workpiece, and moving the pinion cutter straightly downward, and, during upward movement of the main spindle, swinging the distal side of the cutter head in such a way that the pinion cutter is located at a relieved position away from the workpiece, and moving the pinion cutter straightly upward, and the relieving means switches a cycle of the vertical movement of the pinion cutter and an inclination angle of a path of the movement of the pinion cutter with respect to an axis of the workpiece in such a way that, in a case of generating cutting of external teeth in the workpiece, the machining position is located at one side in a radial direction of the pinion cutter and the pinion cutter is moved downward in parallel with the axis of the workpiece, and, in a case of generating cutting of internal teeth in the workpiece, the machining position is located at the other side in the radial direction of the pinion cutter and the pinion cutter is moved downward in parallel with the axis of the workpiece.

A gear shaping machine according to a second aspect of the invention is the gear shaping machine according to the first aspect of the invention characterized in that the relieving means includes a cam provided rotatably and having a cam surface with a predetermined profile, a lever pivotally supported in such a way that one side thereof is swingable and the other side thereof is always in contact with the cam surface of the cam, and a swing unit one side of which is pivotally coupled to the cutter head and configured to be positioned and fixed to any one of two positions at one and the other sides in a pivoting direction, while the other side of which is pivotally coupled to the one side of the lever.

A gear shaping machine according to a third aspect of the invention is the gear shaping machine according to the second aspect of the invention characterized in that the swing unit includes an arm one side of which is pivotally coupled to the cutter head while the other side of which is positionable and fixable to any one of the two positions at the one and the other sides in the pivoting direction, and a rod one side of which is pivotally coupled to the other side of the arm while the other side of which is pivotally coupled to the one side of the lever.

Advantageous Effect of Invention

In the gear shaping machine according to the present invention, the cycle of the vertical movement of the pinion cutter and the inclination angle of the path of the movement of the pinion cutter with respect to the axis of the workpiece can be switched such that the pinion cutter is moved down in parallel with the axis of the workpiece and moved up without interfering with the workpiece respectively at the machining position and the relieved position of the pinion cutter. Accordingly, the width of swing of the cutter head, which occurs during the switching between external tooth generation and internal tooth generation, can be reduced to a small width.

BRIEF DESCRIPTION OF DRAWINGS

Part AI of FIG. 6 is a diagram describing the path of movement of the pinion cutter during the external tooth generation by the gear shaping machine in FIG. 1. Part AII of FIG. 6 is a diagram describing the path of movement of the pinion cutter during the internal tooth generation by the gear shaping machine in FIG. 1. Part BI of FIG. 6 is a diagram describing the path of movement of a pinion cutter during external tooth generation by an exemplary conventional gear shaping machine. Part BII of FIG. 6 is a diagram describing the path of movement of the pinion cutter during internal tooth generation by the exemplary conventional gear shaping machine.

DESCRIPTION OF EMBODIMENT

Hereinbelow, an embodiment of a gear shaping machine according to the present invention will be described based on the drawings. However, the present invention is not limited to the following embodiment described based on the drawings.

Main Embodiment

A main embodiment of the gear shaping machine according to the present invention will be described based on FIGS. 1 to 6.

Figure 1:
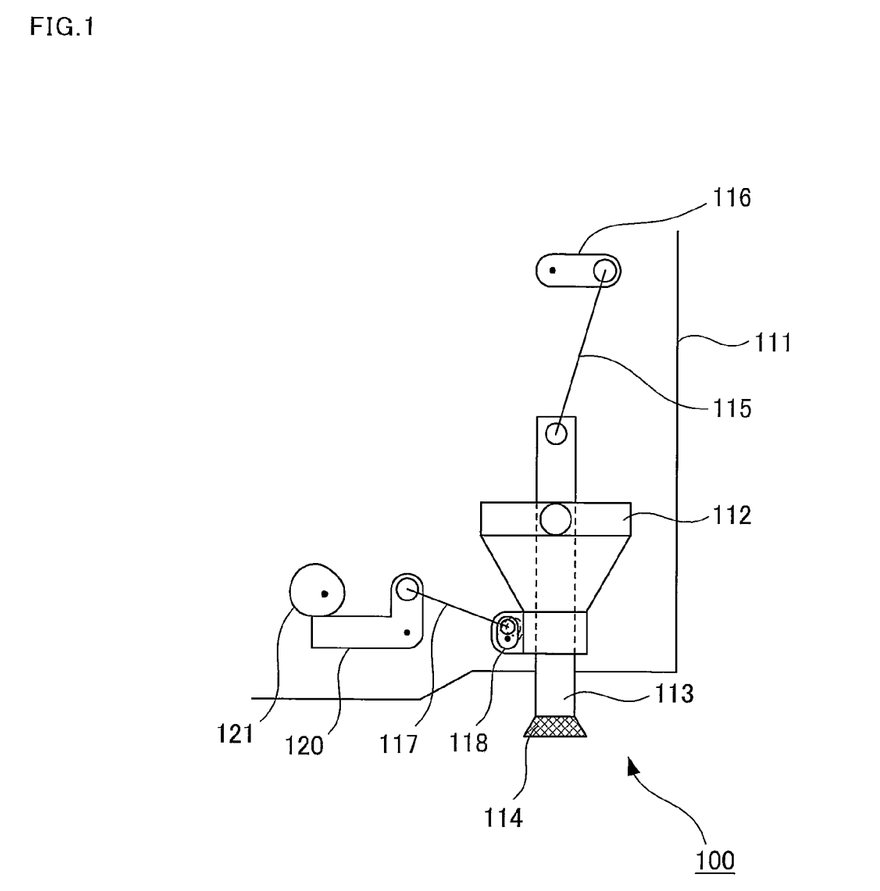
FIG. 1 is a schematic configuration diagram of a main part of a main embodiment of a gear shaping machine according to the present invention.

As shown in FIG. 1, a cutter head 112 is disposed inside a housing 111, and a proximal side of the cutter head 112 is supported pivotally so that a distal side thereof may be swingable. A main spindle 113 is disposed in the cutter head 112 and penetrates therethrough with its distal side projected. The main spindle 113 is supported to be slidable in the axial direction, i.e., movable vertically, and also rotatable in the circumferential direction relative to the cutter head 112. The main spindle 113 has its distal side projected from the inside of the housing 111, and a pinion cutter 114 is coaxially attached to the distal end.

The inner side of an annular external gear (unillustrated) is coaxially spline-coupled to the outer surface of the main spindle 113 so that rotation in the circumferential direction relative to the main spindle 113 may be restricted but movement in the axial direction relative to the main spindle 113 can be permitted. The external teeth on the external gear are meshing directly or indirectly with a drive gear (unillustrated) coaxially coupled to a drive shaft of an unillustrated drive source for rotation.

Specifically, as the drive shaft of the drive source for rotation is rotated, the main spindle 113 can be rotated in the circumferential direction through the drive gear, the external gear, and the like together with vertical movement relative to the cutter head 112. In this embodiment, the external gear, the drive gear, the drive source for rotation, and the like form rotationally driving means.

A distal side of a rod 115 is coupled to the proximal side of the main spindle 113 through a universal joint (unillustrated). A proximal side of the rod 115 is pivotally coupled to a distal side of a crank 116. A proximal side of the crank 116 is coupled to a drive shaft of an unillustrated drive source for vertical movement.

Specifically, as the drive shaft of the drive source for vertical movement is rotated, the crank 116 is rotated about its proximal side to swing its distal side. As transmitted through the rod 115 and the universal joint, the rotation can vertically move the main spindle 113 relative to the cutter head 112 together with the rotation in the circumferential direction. In this embodiment, the universal joint, the rod 115, the crank 116, the drive source for vertical movement, and the like form vertically moving means.

A proximal side (one side) of an arm 118 is coupled to the distal side of the cutter head 112 in such a way as to be pivotable in the same direction as that of the swing of the cutter head 12 about a swing shaft thereof. The proximal side (one side) of the arm 118 can be positioned and fixed to the cutter head 112 in such a way that a distal side (the other side) of the arm 118 can be switched only between two positions and fixed thereto, the two positions including an external-tooth machining position at one side in the pivoting direction (right side in FIG. 1) and an internal-tooth machining position at the other side (left side in FIG. 1). A distal side (one side) of a rod 117 is pivotally coupled to the distal side (the other side) of the arm 118.

A proximal side (the other side) of the rod 117 is pivotally coupled to a distal side (one side) of a lever 120 having a bent portion bent in an L shape and pivotally supported. A cam 121 coupled to a drive shaft of an unillustrated drive source for relief is disposed on a proximal side (the other side) of the lever 120. The distal side (the other side) of the lever 120 is biased by biasing means (unillustrated) to be always in contact with the cam surface of the cam 121.

Specifically, as the drive shaft of the drive source for relief is rotated, the lever 120 is swung in a way corresponding to the cam surface of the cam 121 having a predetermined profile, and thereby swings the distal side of the cutter head 112 through the rod 117 and the arm 118. Accordingly, the position of the distal side of the main spindle 113, i.e. the position of the pinion cutter 114 can be swung and switched between a machining position at which the pinion cutter 114 contacts the workpiece and a relieved position at which the pinion cutter 114 is away from the workpiece.

In this embodiment, the rod 117, the arm 118, and the like form a swing unit, and this swing unit, the lever 120, the cam 121, the biasing means, the drive source for relief, and the like form relieving means.

Next, operations of a gear shaping machine 100 according to this embodiment configured as above will be described based on FIGS. 2 and 3.

Figure 2:
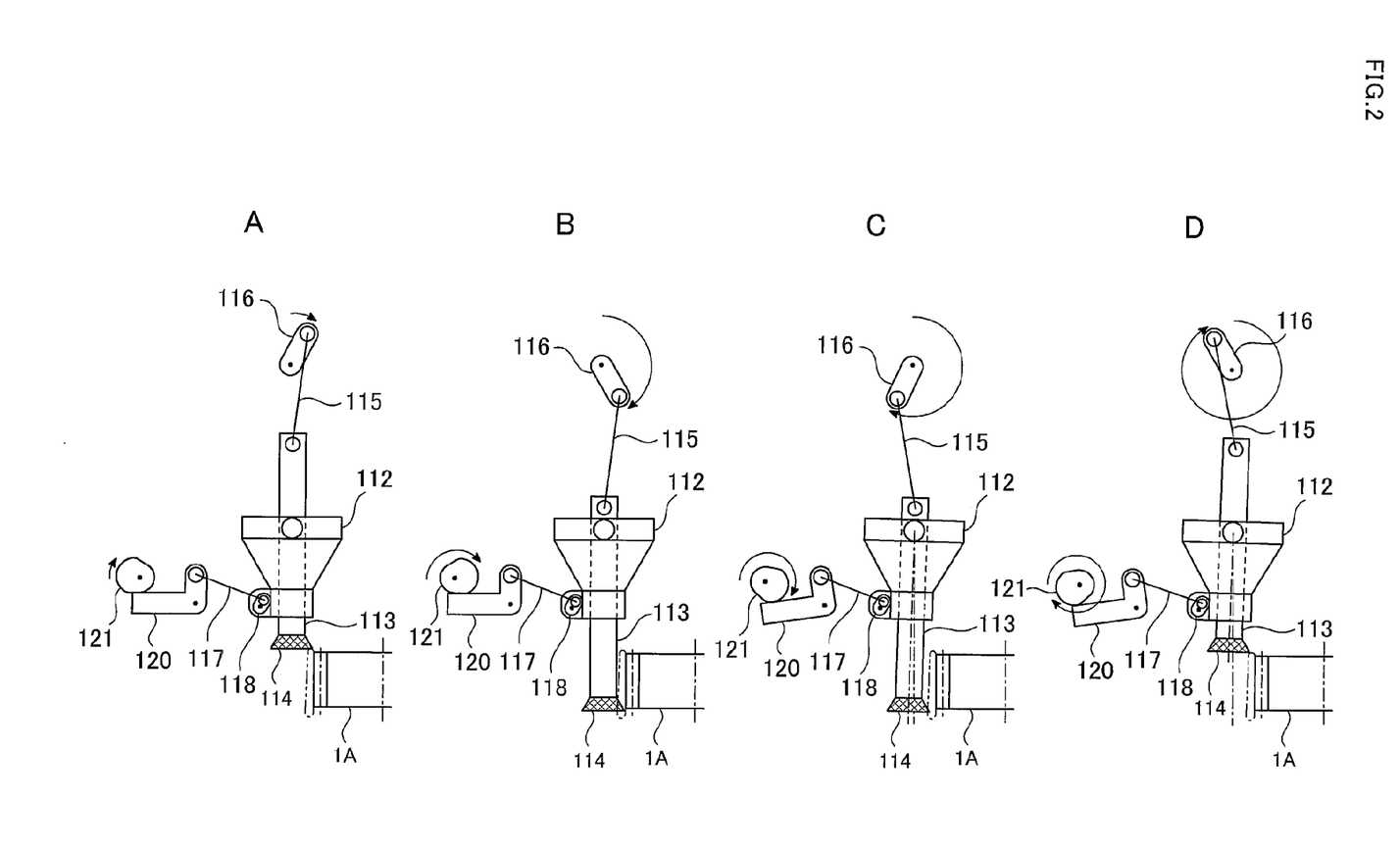
FIG. 2 is a diagram describing an operation in external tooth generation by the gear shaping machine in FIG. 1.

As shown in FIG. 2, in a case of generating external teeth in a disk-shaped workpiece 1A, firstly, the arm 118 is swung clockwise in FIG. 2 so that the distal side of the arm 118 is located at the external-tooth machining position (right side in FIG. 2) and is positioned and fixed there. In addition, the rotational phase of the cam 121 is set such that the cam 121 may be rotated at a vertical movement cycle for external tooth machining.

Subsequently, the drive source for rotation, the drive source for vertical movement, and the drive source for relief are actuated to rotate their drive shafts, and also an unillustrated table supporting the workpiece 1A is rotated. Along with the actuation of the drive source for rotation, the pinion cutter 114 is rotated through the gears and the main spindle 113. Moreover, along with the actuation of the drive source for vertical movement, the pinion cutter 114 is moved down in parallel with the axis of the workpiece 1A through the crank 116, the rod 115, the universal joint, and the main spindle 113. As a result, an external tooth is generated in a portion, in the circumferential direction, of the outer surface of the workpiece 1A (Parts A and B of FIG. 2).

Then, as the pinion cutter 114 is moved down to its lowermost position, the proximal side of the lever 120 is pushed down along with the rotation of the cam 121 by the actuation of the drive source for relief. This swings the distal side of the lever 120 in a direction toward a radially outer side of the workpiece 1A (counterclockwise in FIG. 2), thereby moving the distal side of the cutter head 112 through the rod 117 and the arm 118 in a direction away from the outer surface of the workpiece 1A (leftward in FIG. 2). As a result, the pinion cutter 114 is moved away from the outer surface of the workpiece 1A through the main spindle 113 so as to be located at the relieved position at the other side in the radial direction (left side in FIG. 2), and is also moved up along a straight path (relieving: Parts C and D of FIG. 2).

Then, as the pinion cutter 114 is moved up to its uppermost position, the biasing force of the biasing means based on the rotation of the cam 121 brings the proximal side of the lever 120 back to the initial position. This swings the distal side of the lever 120 in a direction toward a radially inner side of the workpiece 1A (clockwise in FIG. 2) and moves the distal side of the cutter head 112 through the rod 17 and the arm 118 in a direction to approach the outer surface of the workpiece 1A (rightward in FIG. 2). As a result, through the main spindle 113, the pinion cutter 114 approaches the outer surface of the workpiece 1A so as to be located at the machining position at one side in the radial direction (right side in FIG. 2), and also the pinion cutter 114 is again moved down in parallel with the axis of the workpiece 1A. Along with this, the table is rotated, so that another external tooth is continuously generated in the outer surface of the workpiece 1A adjacently to the last generated external tooth (Parts A and B of FIG. 2).

By repeating the above-described operations subsequently, external teeth can be generated in the outer surface of the workpiece 1A over the entire circumferential length thereof.

Figure 3:
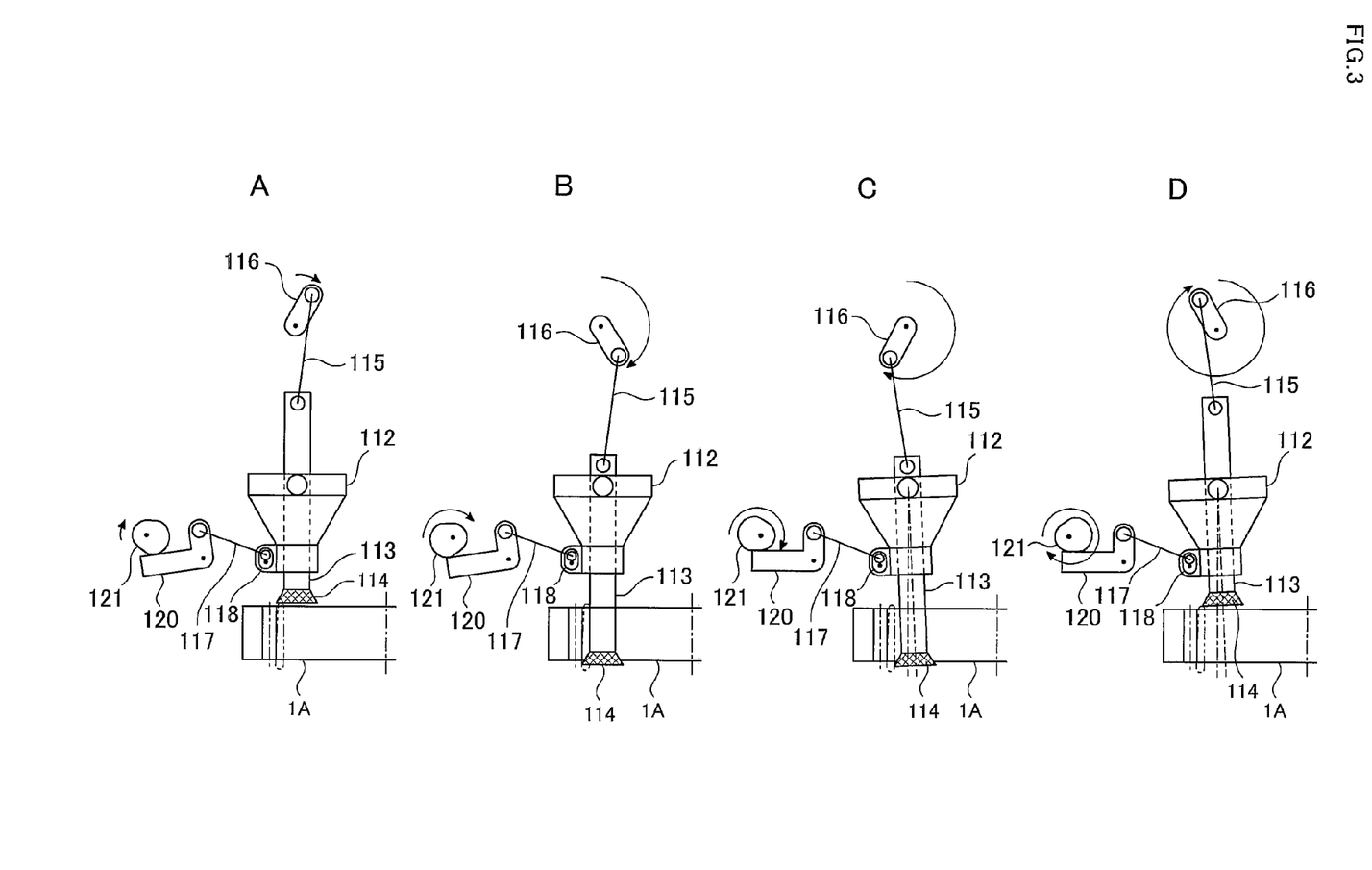
FIG. 3 is a diagram describing an operation in internal tooth generation by the gear shaping machine in FIG. 1.

On the other hand, as shown in FIG. 3, in a case of generating internal teeth in the annular workpiece 1B, firstly, the arm 118 is swung counterclockwise in FIG. 2 so that the distal side of the arm 118 is located at the distal side of the arm 118 at the internal-tooth machining position (left side in FIG. 2), and is positioned and fixed there. In addition, the rotational phase of the cam 121 is set such that the cam 121 may be rotated at a vertical movement cycle for internal tooth machining, that is, with a 180-degree shift from the rotational phase for external tooth machining.

Subsequently, as in the case of external tooth machining, the drive source for rotation, the drive source for vertical movement, and the drive source for relief are actuated to rotate their drive shafts, and also an unillustrated table supporting the workpiece 1B is rotated. Along with the actuation of the drive source for rotation, the pinion cutter 114 is rotated through the gears and the main spindle 113. Moreover, along with the actuation of the drive source for vertical movement, the pinion cutter 114 is moved down in parallel with the axis of the workpiece 1B through the crank 116, the rod 115, the universal joint, and the main spindle 113. As a result, an internal tooth is generated in a portion, in the circumferential direction, of the inner surface of the workpiece 1B (Parts A and B of FIG. 3).

Then, as the pinion cutter 114 is moved down to its lowermost position, the biasing force of the biasing means based on the rotation of the cam 121 pushes up the proximal side of the lever 120. This swings the distal side of the lever 120 in a direction toward a radially inner side of the workpiece 1B (clockwise in FIG. 3) and moves the distal side of the cutter head 112 through the rod 117 and the arm 118 in a direction away from the inner surface of the workpiece 1B (rightward in FIG. 3). As a result, the pinion cutter 114 is moved away from the inner surface of the workpiece 1B through the main spindle 113 so as to be located at the machining position at the one side in the radial direction (right side in FIG. 3), and is also moved up along a straight path (relieving: Parts C and D of FIG. 3).

Then, as the pinion cutter 114 is moved up to its uppermost position, the proximal side of the lever 120 is pushed up back to its initial position along with the rotation of the cam 121 by the actuation of the drive source for relief. This swings the distal side of the lever 120 in a direction toward a radially outer side of the workpiece 1B (counterclockwise in FIG. 3) and moves the distal side of the cutter head 112 through the rod 17 and the arm 118 in a direction to approach the inner surface of the workpiece 1B (leftward in FIG. 3). As a result, through the main spindle 113, the pinion cutter 114 approaches the inner surface of the workpiece 1B so as to be located at the machining position at the other side in the radial direction (left side in FIG. 3), and also the pinion cutter 114 is again moved down in parallel with the axis of the workpiece 1B. Along with this, the table is rotated, so that another internal tooth is continuously generated in the inner surface of the workpiece 1B adjacently to the last generated internal tooth (Parts A and B of FIG. 3).

By repeating the above-described operations subsequently, internal teeth can be generated in the inner surface of the workpiece 1B over the entire circumferential length thereof.

Figure 6:
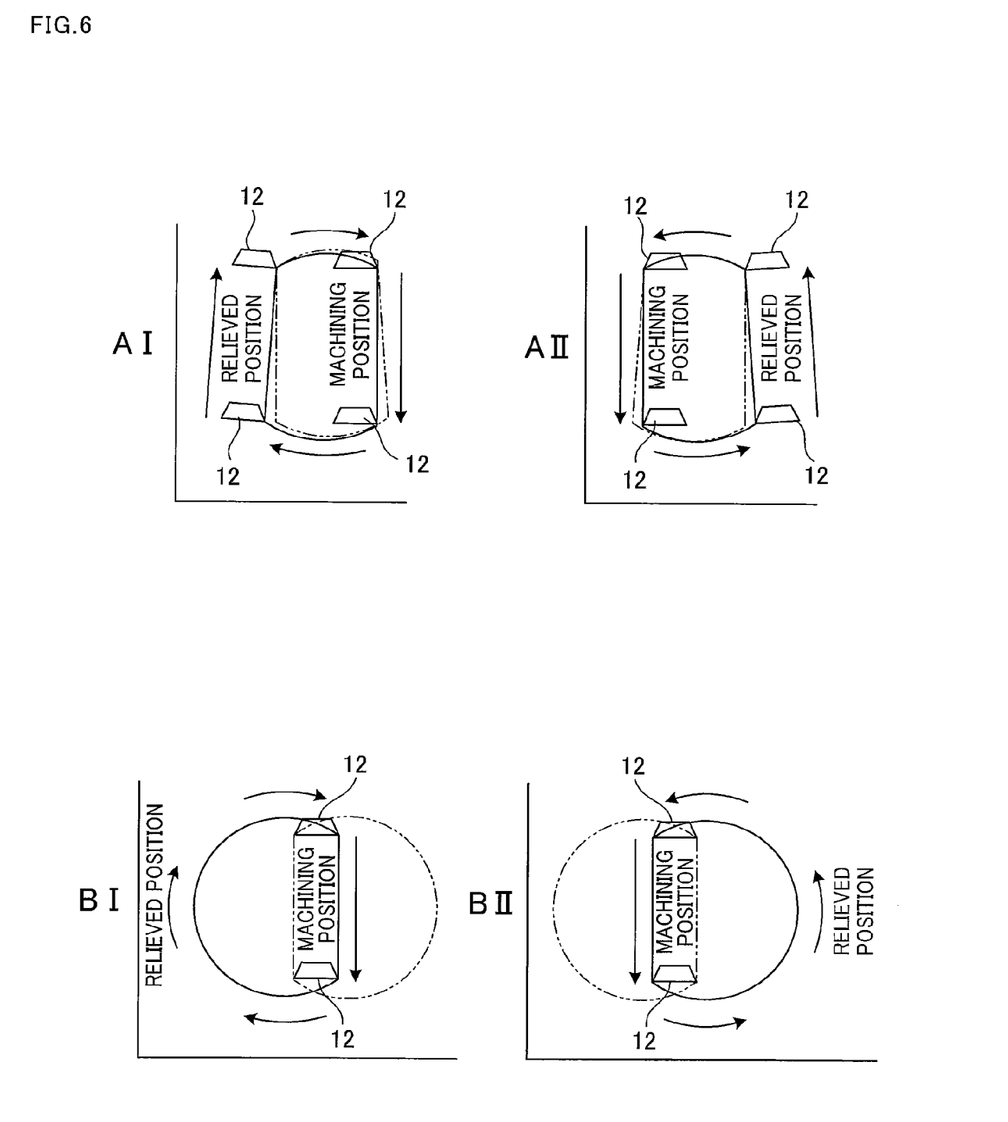

Specifically, as shown in Parts BI and BII of FIG. 6, in the conventional gear shaping machine 10, the switching is performed by inversing the path of the movement of the pinion cutter 14, the path being defined by the predetermined profile of the cam surface of the cam 21 in which a straight profile for downward movement and an arc profile for upward movement are combined, so that the pinion cutter 14 can be moved down in parallel with the axis of the workpiece 1A/1B and moved up without interfering with the workpiece 1A/1B respectively at the machining position (right side in Part BI of FIG. 6/left side in Part BII of FIG. 6) and the relieved position (left side in Part BI of FIG. 6/right side in Part BII of FIG. 6) of the pinion cutter 14. In contrast, as shown in Parts AI and AII of FIG. 6, in the gear shaping machine 100 according to this embodiment, the switching is performed by changing the inclination angle of the path of the movement of the pinion cutter 114 with respect to the axis of the workpiece 1A/1B, the path being defined by the predetermined profile of the cam surface of the cam 121 in which two straight profiles each being a straight profile usable for both the downward movement and the upward movement are combined, and by shifting the rotational phase of the cam 121 by 180 degrees to reverse the vertical movement cycle of the pinion cutter 114, so that the pinion cutter 114 can be moved down in parallel with the axis of the workpiece 1A/1B and moved up without interfering with the workpiece 1A/1B respectively at the machining position (right side in Part AI of FIG. 6/left side in Part AII of FIG. 6) and the relieved position (left side in Part AI of FIG. 6/right side in Part AII of FIG. 6) of the pinion cutter 114.

Figure 4:
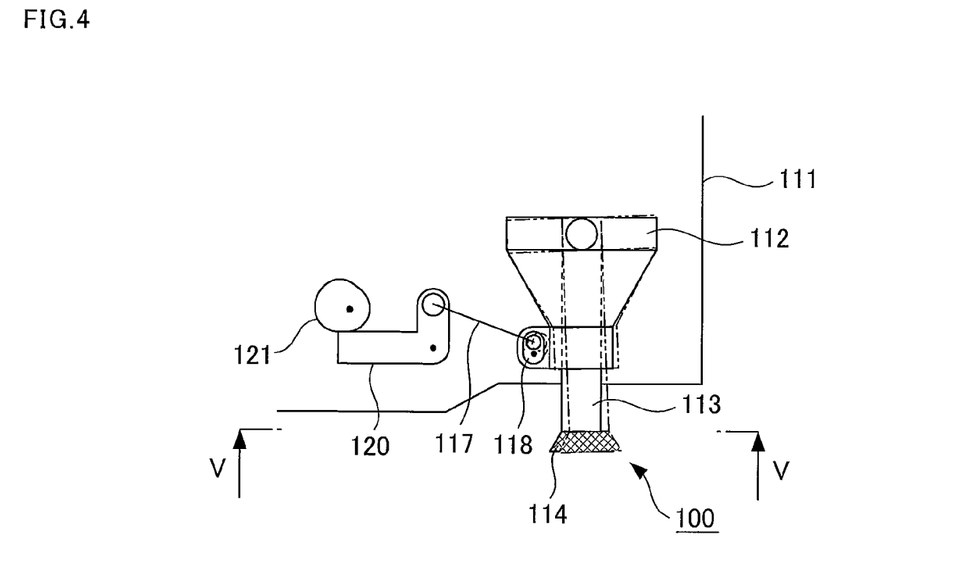
FIG. 4 is a diagram describing an operation in the switching of the machining position of a pinion cutter of the gear shaping machine in FIG. 1.

Thus, in the conventional gear shaping machine 10, since the link 18 is largely pivoted in the top-bottom direction to inverse the path of the movement of the pinion cutter 14, the width of the swing of the cutter head 12, which occurs during the switching between the external tooth generation and the internal tooth generation, becomes large. In contrast, in the gear shaping machine 100 according to this embodiment, the switching only requires: rotating the cam 121 by 180 degrees to switch the vertical movement cycle of the pinion cutter 114; and slightly swinging the distal side of the arm 118 in the left-right direction to switch the inclination angle of the path of the movement of the pinion cutter 114 with respect to the axis of the workpiece 1A/1B, that is, swinging the cutter head 112 by an amount equivalent to the amount of movement between the machining position and the relieved position of the pinion cutter 114 (the amount of the relieving). Hence, the width of the swing of the cutter head 112, which occurs during the switching between the external tooth generation and the internal tooth generation, can be made significantly small as shown in FIG. 4.

Figure 5:
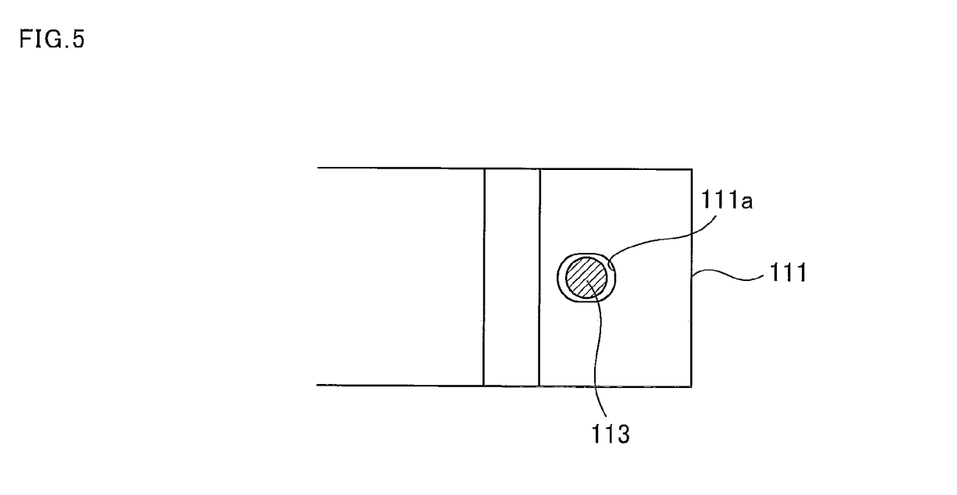
FIG. 5 is a diagram viewed in the direction of the arrows V in FIG. 4.

Accordingly, in the gear shaping machine 100 according to this embodiment, the space existing within the housing 111 only for permitting the swing of the cutter head 112 in the switching can be made significantly small. Thus, the size of the housing 111 can be reduced. Moreover, the width of the swing of the main spindle 113 can be made significantly small, so that an opening 111a through which the main spindle 113 is projected from the inside of the housing 111 only needs to have a minimal required size. Hence, various means for preventing the entry of foreign matters, such as cutting oil and chips, can be made significantly simple, and therefore cost reduction can be achieved.

INDUSTRIAL APPLICABILITY

The gear shaping machine according to the present invention is capable of reducing the amount of the swing of the cutter head, which occurs during the switching between the external tooth generation and the internal tooth generation, to a small width. Thus, the size of the housing can be reduced. Moreover, the opening through which the main spindle is projected from the inside of the housing only needs to have a minimal required size. Hence, various means for preventing the entry of foreign matters, such as cutting oil and chips, can be made significantly simple, and therefore cost reduction can be achieved. Accordingly, the gear shaping machine according to the present invention can be industrially utilized significantly beneficially.

REFERENCE SIGNS LIST 1A workpiece (disk shape)
1B workpiece (annular shape)
100 gear shaping machine
111 housing
111a opening
112 cutter head
113 main spindle
114 pinion cutter
115 rod
116 crank
117 rod
118 arm
120 lever
121 cam

The invention claimed is:

1. A gear shaping machine configured to manufacture a gear through generating cutting of external teeth and internal teeth in a workpiece by means of a pinion cutter, the gear shaping machine comprising:
   a main spindle, to a distal end of which the pinion cutter is attached;
   a cutter head on which the main spindle is rotatably and vertically movably supported with a distal side of the main spindle projected from a distal side of the cutter head, and which is pivotally supported at a proximal side thereof;
   rotationally driving means for rotationally driving the main spindle;
   vertically moving means for vertically moving the main spindle; and
   relieving means for, during downward movement of the main spindle, swinging the distal side of the cutter head in such a way that the pinion cutter is located at a machining position at which the pinion cutter contacts the workpiece, and moving the pinion cutter straightly downward, and, during upward movement of the main spindle, swinging the distal side of the cutter head in such a way that the pinion cutter is located at a relieved position away from the workpiece, and moving the pinion cutter straightly upward, wherein
   the relieving means switches a cycle of the vertical movement of the pinion cutter and an inclination angle of a path of the movement of the pinion cutter with respect to an axis of the workpiece in such a way that, in a case of generating cutting of external teeth in the workpiece, the machining position is located at one side in a radial direction of the pinion cutter and the pinion cutter is moved downward in parallel with the axis of the workpiece, and, in a case of generating cutting of internal teeth in the workpiece, the machining position is located at the other side in the radial direction of the pinion cutter and the pinion cutter is moved downward in parallel with the axis of the workpiece,
   the relieving means includes
      a cam provided rotatably and having a cam surface with a predetermined profile,
      a lever pivotally supported in such a way that one side thereof is swingable and the other side thereof is always in contact with the cam surface of the cam, and
      a swing unit one side of which is pivotally coupled to the cutter head and configured to be positioned and fixed to any one of two positions at one and the other sides in a pivoting direction, while the other side of which is pivotally coupled to the one side of the lever, and
   the swing unit includes
      an arm one side of which is pivotally coupled to the cutter head while the other side of which is positionable and fixable to any one of the two positions at the one and the other sides in the pivoting direction, and
      a rod one side of which is pivotally coupled to the other side of the arm while the other side of which is pivotally coupled to the one side of the lever.

* * * * *